(12) United States Patent
Hillis et al.

(10) Patent No.: US 6,421,776 B1
(45) Date of Patent: Jul. 16, 2002

(54) DATA PROCESSOR HAVING BIOS PACKING COMPRESSION/DECOMPRESSION ARCHITECTURE

(75) Inventors: Robert G. Hillis, Boca Raton; Eric C. Rasmussen, Boynton Beach, both of FL (US)

(73) Assignee: International Business Machines Corporation, Armonk, NY (US)

( * ) Notice: Subject to any disclaimer, the term of this patent is extended or adjusted under 35 U.S.C. 154(b) by 1040 days.

(21) Appl. No.: 08/892,822

(22) Filed: Jul. 15, 1997

Related U.S. Application Data

(63) Continuation of application No. 08/322,500, filed on Oct. 14, 1994.

(51) Int. Cl.[7] ................................................. G06K 9/36
(52) U.S. Cl. .......................................................... 713/2
(58) Field of Search ........................ 395/821, 654–653, 395/284

(56) References Cited

U.S. PATENT DOCUMENTS

| | | | | |
|---|---|---|---|---|
| 5,016,009 A | * | 5/1991 | Whiting et al. | 341/67 |
| 5,022,077 A | * | 6/1991 | Bealkowski et al. | 380/4 |
| 5,136,713 A | * | 8/1992 | Bealkowski et al. | 395/700 |
| 5,187,792 A | * | 2/1993 | Dayan et al. | 395/700 |
| 5,193,170 A | * | 3/1993 | Lam | 395/473 |
| 5,202,994 A | * | 4/1993 | Begur et al. | 395/700 |
| 5,210,875 A | * | 5/1993 | Bealkowski et al. | 395/700 |
| 5,355,498 A | * | 10/1994 | Provino et al. | 395/700 |
| 5,423,019 A | * | 6/1995 | Lin | 395/425 |
| 5,455,933 A | * | 10/1995 | Schieve et al. | 395/892 |
| 5,481,701 A | * | 1/1996 | Chambers, IV | 707/101 |
| 5,491,790 A | * | 2/1996 | Keeley et al. | 395/183.12 |
| 5,530,847 A | * | 6/1996 | Schieve et al. | 395/183.14 |
| 5,559,978 A | * | 9/1996 | Spilo | 711/203 |
| 5,574,927 A | * | 11/1996 | Scantlin | 395/800 |

FOREIGN PATENT DOCUMENTS

WO     WO19768    *   9/1994

OTHER PUBLICATIONS

"Compressed IPL ROM", disclosed Anonymous, Jan. 10, 1992.*

Swanke, E. John, "BIOS Compression", May/Jun. 1991, pp. 65–68.*

* cited by examiner

*Primary Examiner*—Paul R. Myers
(74) *Attorney, Agent, or Firm*—John B. Schelkopf; Andrew Dillon

(57) ABSTRACT

To increase the effective capacity of BIOS, an initial portion of the power on system reset (POST) code that is required to enable the system memory is stored in ROM in uncompressed form, and substantially the remaining portion of the BIOS code is stored in compressed form. Upon system initialization during a cold boot, the uncompressed portion of POST is executed from the ROM to enable the system memory, and then an image of the BIOS code is written to shadow memory. As BIOS code is needed during the remainder of the boot, the code is selectively decompressed from the shadow memory to another region of the system memory to which control is transferred. Variations based upon different boot scenarios are described.

3 Claims, 9 Drawing Sheets

FIG. 4

| ROM | ADDRESS RANGE |
|---|---|
| JMP | FFFFF |
| Available | FFFF0 |
| Compressed Set-Up Data | |
| Compressed Set-Up Code | |
| Compressed Phase 2 POST | |
| Unpacked Phase I POST | |
| | F0000 |
| Available | EFFFF |
| Compressed Video | |
| Compressed Smart Energy System™ | |
| Compressed BIOS | |
| | E0000 |

DATA PROCESSOR HAVING BIOS PACKING COMPRESSION/DECOMPRESSION ARCHITECTURE

The application is a continuation, of application Ser. No. 08/322,500, filed Oct. 14, 1994.

BACKGROUND OF THE INVENTION

1. Field of the Invention

This invention relates generally to data processing, and more particularly, to storage and execution of BIOS code in a personal computer.

2. Description of Related Art

All computers, such as the various models of personal computers, or PC's, produced by IBM Corporation, execute "operating system software" that instructs the PC on how to use other programs, termed "application software," such as word processing and spreadsheet programs. Examples of PC operating systems include MS-DOS and WINDOWS, manufactured by Microsoft Corporation, and IBM's OS/2.

Before a PC can run an operating system, it must load the operating system from a disk to the PC's working memory which is ordinarily random access semiconductor memory (RAM). This is carried out through a process known as "bootstrapping," or more simply, "booting" the PC. Booting occurs automatically when the PC is first turned on, a process called a "cold boot," or by the user while the computer is running ("warm boot").

Bootstrapping performs only two functions, the first being to run a power-on self-test, or POST, and the other to search the storage media (floppy diskette or hard disk) for the operating system it will load. These functions are controlled by firmware stored in one or more basic input-output system, or BIOS chips inside the PC.

The POST initializes all the internal hardware and hardware connected to the PC known to it, such as memory, and tests and places the hardware in an operational state. The BIOS program then normally checks drive A of the PC to determine if it contains a formatted floppy disk. If a disk is mounted in the drive, the program searches specific locations on the disk to determine if a valid boot record exists. If the floppy drive is empty, the boot program checks the hard drive C for the system files. In the absence of these files, the BIOS will generate an error message.

After locating a disk with a valid boot record, the BIOS program reads the data stored on the first sector of the disk, and copies that data to specific locations in RAM. This information, found in the same location on every formatted disk, constitutes the DOS boot record. The BIOS then passes control to the boot record which instructs the PC on how to load the two hidden operating system files to RAM (the files named IBMBIO.COM and IBMDOS.COM on IBM computers). After loading other operating system files into RAM to carry out the rest of the boot up sequence, the boot record is no longer needed.

The root directory of the boot disk is next searched for a file created by the user (CONFIG.SYS) and which contains commands instructing the operating system how to handle certain operations such as how many files may be opened at a time, and so-called device drivers which describe the existence and characteristics of hardware devices not recognized by BIOS that may be connected to the PC.

Next loaded from the boot disk into RAM is the file COMMAND.COM which is an operating system file containing, among other functions, fundamental DOS commands used throughout application program execution, and a file named AUTOEXEC.BAT created by the user and containing a series of DOS batch file commands or program names to be executed by the PC each time the computer is turned on. This completes the boot up sequence, and at this point the computer is considered fully booted and ready to be used.

The IBM PC operating environment is depicted in FIG. 1, a map of the first 1M of random access system memory. Within the first 640 Kbyte region of the system memory is stored base BIOS data, such as interrupt vectors and other machine specific operating parameters such as identification of drives and access to them through BIOS INT 13 functions. This is followed in the same region of memory by the operating system, such as DOS, followed by any application programs. Residing in the upper layers of the system memory, above 640K (called "upper memory") but beneath the 1 Mbyte boundary are video data and firmware based BIOS which is fixed for all applications.

Considering now the BIOS itself in more detail, it is the hardware abstraction layer common to all IBM PC compatible systems. The BIOS consists of code carrying out prescribed functions including converting operating signals developed by an operating system executed by the CPU into electrical signals compatible with devices that are responsive to signals provided by the CPU to the system bus. However, as new features and new industry support are introduced, the BIOS must be supplemented or revised to accommodate them. In addition, the BIOS must remain compatible with the currently very large PC install base.

However, the size of the portion of the read only memory (ROM) resident in a PC for storing BIOS code is limited. As depicted In FIG. 1, the address range 0 through FFFFFh reserves only the 128 Kbytes of RAM above E0000h for BIOS. It is necessary to restrict the size of the BIOS to accommodate that constraint in order to retain architectural compatibility with the PC despite that new industry imperatives, such as Plug and Play, PCI, APM 1.1, Smart Energy System (TM) and others continue to evolve and impose additional BIOS requirements. In view of the 128K boundary defined for BIOS, the existing BIOS ROM is insufficient in size to accommodate the necessary services (features and functions).

Furthermore, during PC operation, it is necessary to load an image of the BIOS into an area of the main memory, called "shadow memory," to increase execution speed. The shadow memory stores a replica or image of the BIOS, and enables execution of BIOS routines much faster than would be possible directly from the BIOS ROM.

BIOS developers have attempted to overcome the 128K BIOS limitation by using such techniques as paging or bank switching memory which uses a ROM larger than 128K. However, paging and other approaches that require a ROM memory of increased size are accompanied by additional hardware requirements, and hence, cost, and in some cases, system performance degradation.

Other attempts to satisfy these requirements have included compressing parts of the BIOS in the ROM and decompressing these parts from the ROM into the shadow RAM area upon boot. These attempts have been limited, however, to compressing only the SETUP and, more recently, the video BIOS area. But the remaining portions of the BIOS code have not been a candidate for compression, among other reasons because there has been no mechanism for compressing large blocks of BIOS including the POST component of the BIOS code, decompressing and then booting successfully.

More particularly, a problem is encountered when considering how to compress and thereafter decompress BIOS code upon system initialization. That is, it has not been determined how to successfully carry out a boot when the ROM is compressed, or how to do so under different boot scenarios, such as (1) cold boot, (2) warm boot or reset of the CPU in real mode (that is, having conventional memory only), and (3) warm boot or reset of the CPU in protect mode (for example, having conventional memory and expanded memory).

Furthermore, decompression of BIOS from the ROM into the shadow memory is relatively slow, increasing the time required for bootstrapping. This slow processing is a property inherent in moving data from ROM for handling by the CPU.

SUMMARY OF THE INVENTION

An advantage of the invention is in overcoming the foregoing BIOS limitations while maintaining compatibility with existing PC architecture. Another advantage is in reducing the time required for bootstrapping. A further advantage is in performing BIOS code decompression under different boot sceneries, cold and warm, and upon memory conditions of real and protect.

The invention provides a data processing system comprising a central processing unit (CPU), a system memory for storing data in the form of electrical signals, a first port for receiving an input device generating electrical input signals, and at least one second port for supplying electrical output signals to output devices. The CPU is of a type including a BIOS circuit for carrying out prescribed functions including converting operating signals developed by an operating system executed by the CPU into electrical signals compatible with devices that are responsive to signals provided by the CPU to the system bus. In accordance with an important aspect of the invention, an initial portion of the BIOS code that is required to enable the system memory is in uncompressed form and a remaining portion thereof for carrying out prescribed functions including converting operating signals developed by an operating system executed by the CPU into electrical signals compatible with devices that are responsive to signals provided by the CPU to the system bus, is in compressed form.

In accordance with an aspect of the invention, the portion of the BIOS code that is uncompressed in ROM includes an initial portion of a power on system test (POST) code which is sufficient to enable the system memory, a remaining portion of which is compressed.

To reduce the time required for decompression of BIOS code, the code is transferred from ROM to the system memory in compressed form. Then, after a jump from one location of the system memory to another, decompression of the code takes place.

Upon cold boot, the initial portion POST is read directly from ROM to enable the system memory, and then an image of the entire BIOS code, the major portion of which is in compressed form, is written to RAM in the system memory, and control is transferred to the image. As needed, portions of the BIOS code including POST, Setup (if invoked) and then other BIOS routines are selectively decompressed from the shadow memory to another location of the system memory. Normal execution of POST and BIOS then proceeds until the boot is completed.

Upon a warm boot call, when the processor is in real mode, that is conventional with respect to INTEL 8088 type microprocessors, the procedure is similar but requires a solution to a complication, namely, that whereas the uncompressed POST code in ROM must be executed, the decompressed BIOS is currently mapped into the upper region of the system memory reserved for BIOS (000F0000h–000FFFFFh). Hence, in accordance with a particular aspect of the invention, ROM mapping is modified by carrying out a memory swapping process as follows. System BIOS restarts the system by transferring control to the region of the BIOS image corresponding to power up (000FFFF0h) in shadow RAM. Then, control is transferred to a region lower in the shadow RAM image (000E0000h–000EFFFFh). The upper region of the image (000F0000h–000FFFFFh) is remapped from shadow RAM to ROM, and control is transferred to that region (in ROM).

On the other hand, upon a warm boot call when the processor is in protect mode, that is, adapted for a system having more than 1 Mbyte of memory when both conventional and expanded memory are enabled, the scenario is complicated upon a reboot call by loading of an EMS (Expanded Memory Specification) emulator or issuance of an BIOS shutdown in the conventional "286" or higher system. In accordance with another aspect of the invention, under this scenario, the first instruction executed is identical both in the ROM image and in the decompressed BIOS image. In the preferred embodiment, the instruction at the same location (FFFFFFF0h) is read from ROM, the same as for a cold boot. Unlike cold boot, however, control is then transferred to the ROM image (000F0000h–000FFFFFh) region in the shadow RAM, and warm boot continues as in the scenario. described above for real memory mode. Since control proceeds to the same address in ROM (cold boot) and shadow RAM (warm boot), the instructions at FFFFFFF0h and 000FFFF0h are identical. Hence, BIOS code exists at the target address in both locations.

Still other advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF THE DRAWING(S)

FIG. 4 is a diagram of a BIOS ROM image bearing compressed BIOS code, in accordance with the invention

Figure 6A:
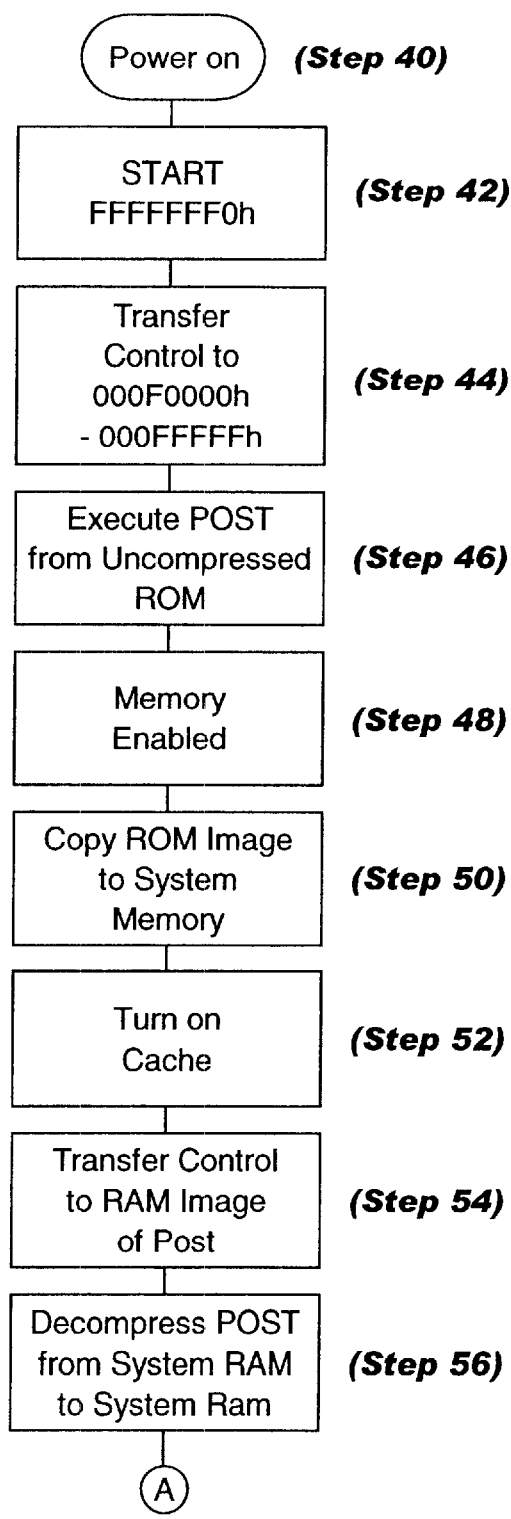
Figure 6B:
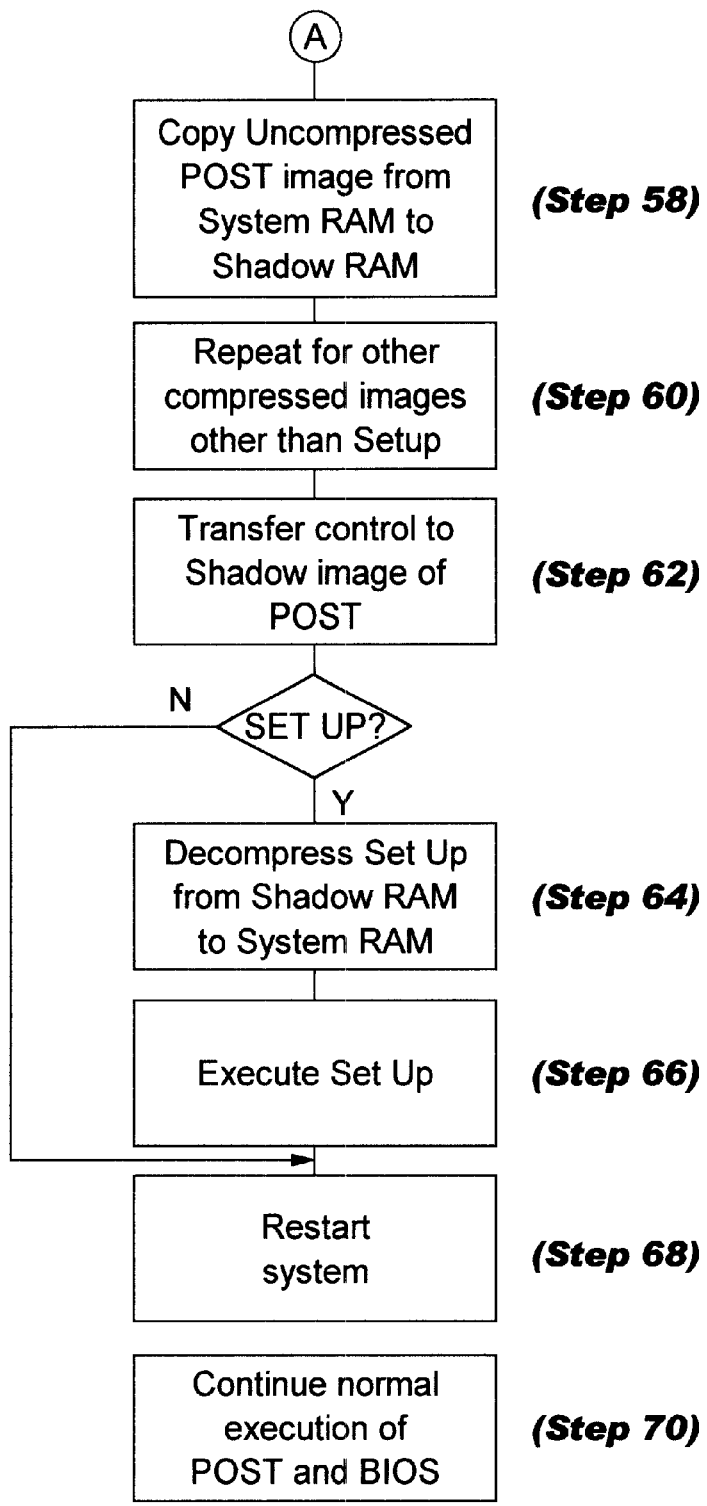

FIGS. 6(a) and 6(b) are a flow chart showing a cold boot scenario carried out in accordance with an aspect of the invention.

Figure 7:
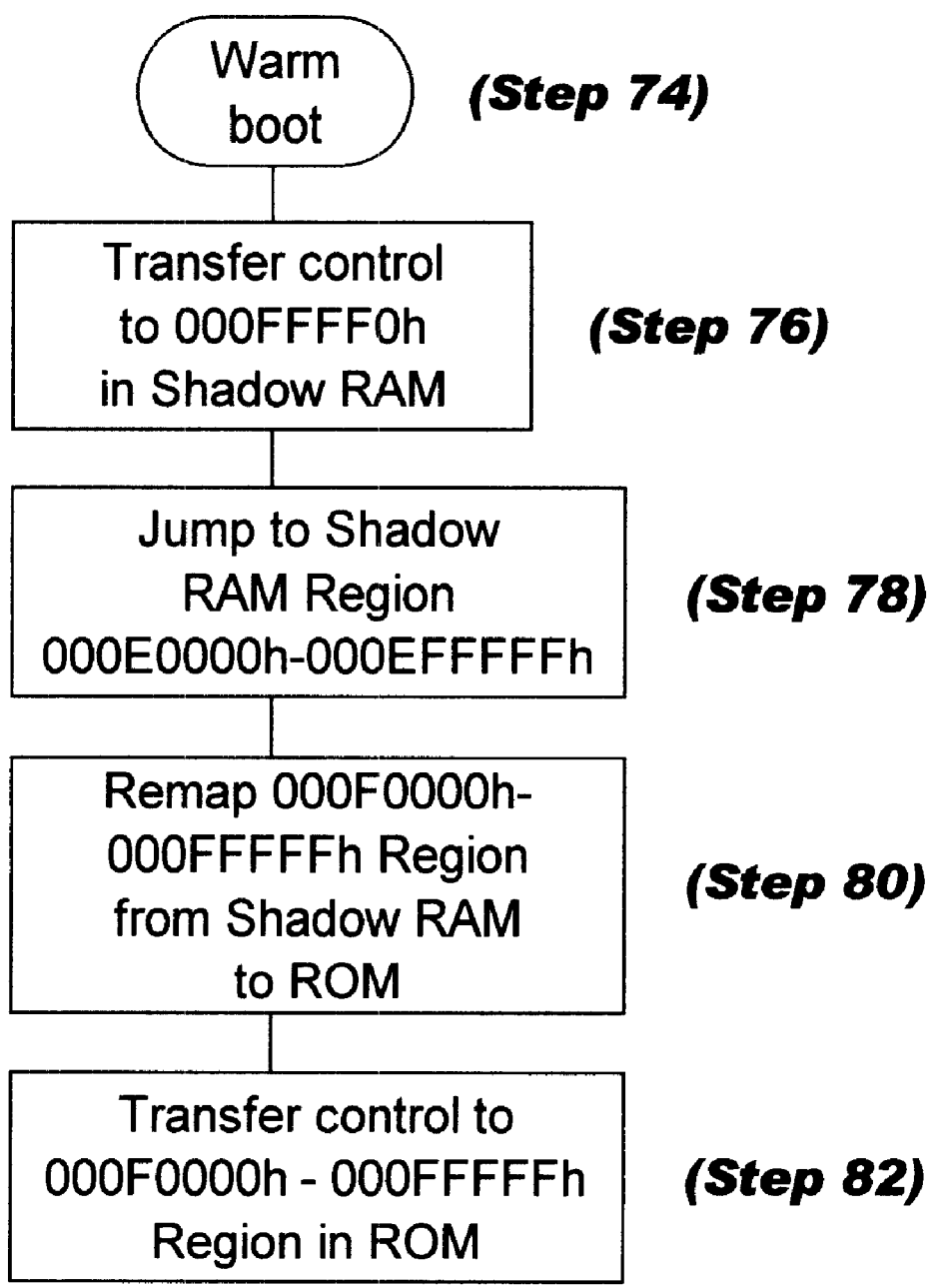

FIG. 7 is a flow chart showing a warm boot scenario performed in real mode.

Figure 8:
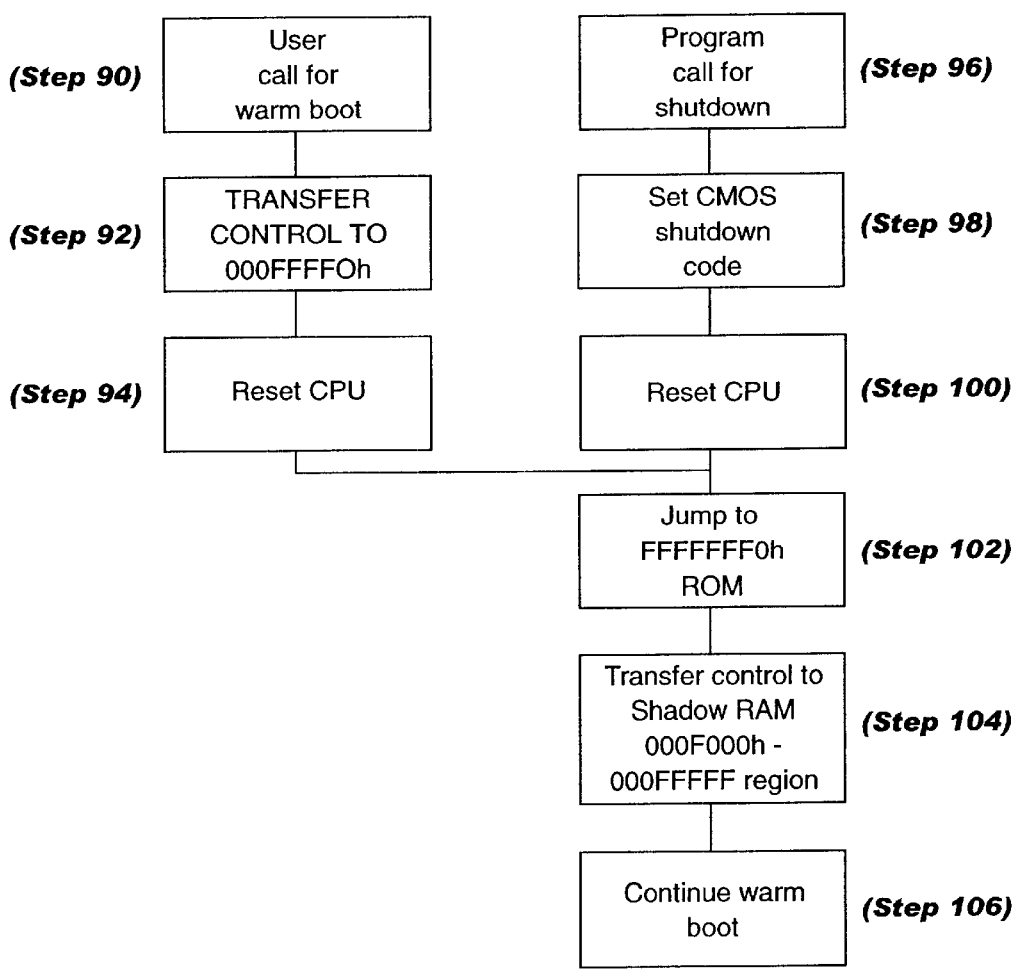

FIG. 8 is a flow chart showing a warm boot scenario performed in protect mode.

DESCRIPTION OF THE ILLUSTRATIVE EMBODIMENT(S)

Figure 2:
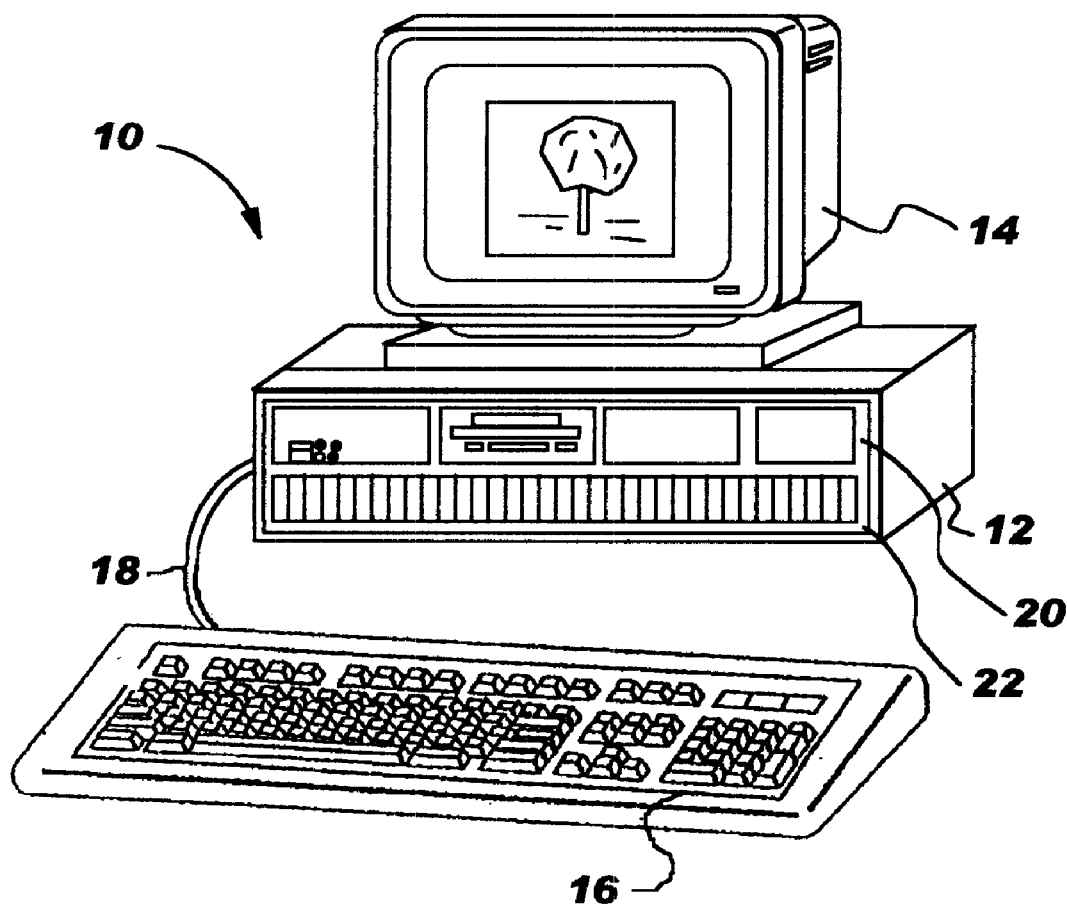
FIG. 2 is a perspective view of a personal computer system within which the present invention has application.

With reference now to the Figures, and in particular with reference to FIG. 2, a personal computer, or PC, designated 10 is of the environment to which the invention has particular.utility. The computer 10 which preferably, but not necessarily, is of a type utilizing an IBM Personal Computer or similar system, includes a console housing 12 within which circuit boards containing the necessary circuitry including microprocessor and BIOS chips, controllers, random access memory and other hardware are arranged. The computer will also include a video display 14 and a keyboard 16 connected into the housing 12 through cable 18. Mass storage media include a hard drive within the housing and not accessible to the user, and user accessible floppy disk as well as, optionally, CD-ROM drives, 20 and 22.

Figure 3:
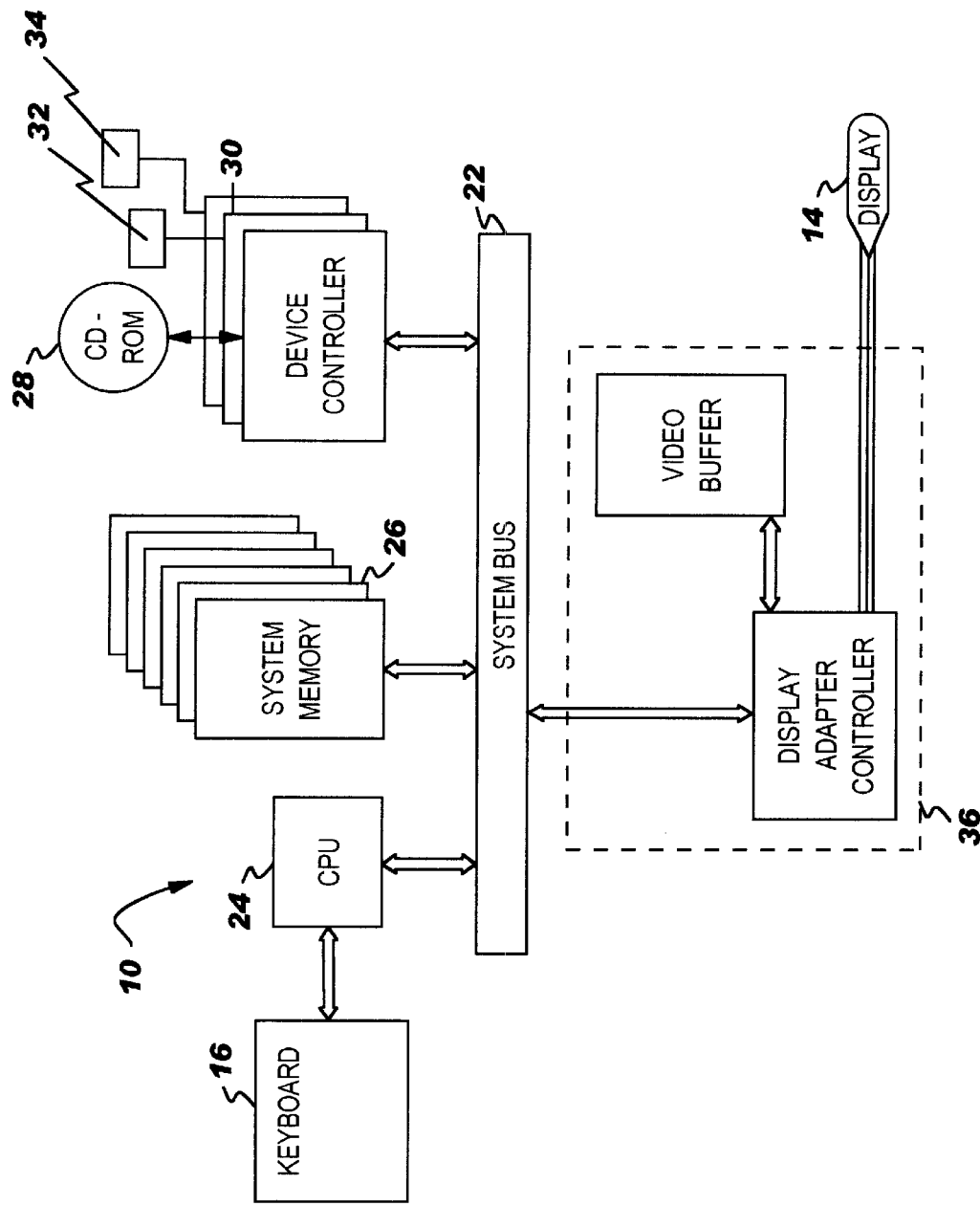
FIG. 3 is a block diagram of a personal computer based data processing system within which the invention may reside.

The architecture of computer system 10, depicted in FIG. 3, is based on a system bus 22 on which data is passed between components of the computer, including a central processing unit (CPU) 24. Data are stored in floppy, CD-ROM and hard disk drives 28, 32 and 34 for access by the CPU 24 through corresponding controllers 30. Display 14 is connected to the system bus 22 through a video controller 36.

Within or associated with CPU 24 is BIOS presented in the form of firmware that forms an interface between the CPU and signals placed on the system bus by the system hardware, as described previously. With reference to FIG. 4, the BIOS resides in the 128 kbyte address space between E0000h and FFFFFh. In accordance with the best mode of practicing this invention, the BIOS functions are arranged, shown in FIG. 4, as follows.

At the uppermost end (FFF0h) is a jump instruction, which will enable control of the system to move to a prescribed address in ROM or the system memory. The next layers of the BIOS ROM consist of compressed set-up data, including descriptive text, and compressed setup code. Next, all but the initial portion of the power on system test (POST) code (termed "phase 2 POST herein") is stored in compressed form, the initial portion of POST (termed "phase 1 POST") being stored in the next lower layer of BIOS ROM.

The phase 1 POST code, which is stored in uncompressed (unpacked) form, consists of only that portion of POST that is necessary to enable the system memory. That is, under conventional BIOS protocol, the initial portion of POST is first read from the BIOS ROM to enable or "wake up" the system memory, usually composed of CMOS type random access semiconductor memory. Then, all the remaining portion of POST and other BIOS code are copied to memory in a region thereof termed "shadow RAM" or "shadow memory." One aspect of the invention resides in the realization that the initial portion of POST should not be compressed, as uncompressed POST is necessary to enable the memory and permit BIOS uncompression to be performed later during initialization.

The next layer of BIOS ROM (EFFFF(h)) is reserved; the layers beneath it consist of compressed video code, compressed Smart Energy System (TM) code (SES) (or equivalent power management code) and compressed BIOS code.

Compression of set-up data and code, phase 2 POST, video, Smart Energy System (TM) and BIOS code is carried out by any commercially available LZ-1 or LZ-2 algorithm, such as the techniques identified in U.S. Pat. Nos. 4,701,745 and 5,016,009, incorporated herein by reference. Other suitable compression and decompression algorithms, can be used, however.

Figure 5:
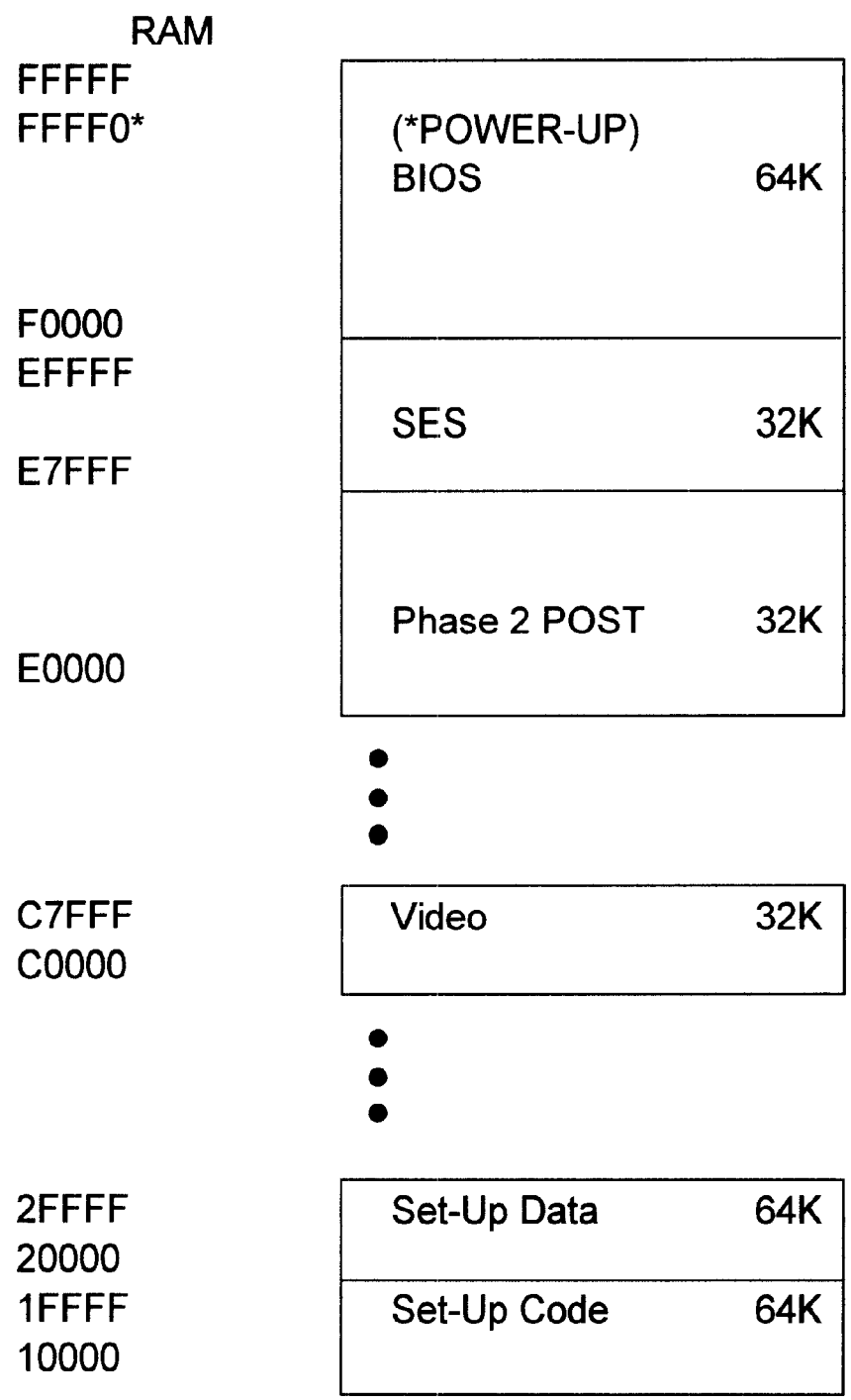
FIG. 5 is a diagram showing the BIOS ROM image decompressed into shadow RAM.

As shall be described in more detail hereinafter, upon system initialization (bootstrapping), an image of the BIOS ROM is copied to the upper 128 kbyte region of system memory, or shadow RAM, from where system execution takes place for higher operating speed. Shadowing of the BIOS is well known. In accordance with the invention, however, most of the BIOS code is stored in ROM in compressed form. Mapping from the BIOS ROM to the system memory is followed by decompression only of those BIOS routines that are necessary. Referring to FIG. 5 depicting the BIOS decompressed shadow RAM image, the upper 64K of shadow memory contains decompressed BIOS code, the lowest 32K portion of the upper 128 kbyte block contains decompressed phase 2 POST code, decompressed set-up data and code reside at the lowest 128K in system memory, and decompressed video and SES reside as shown.

How the system operates to execute the BIOS ROM with compressed code will become clear from a description of system initialization through three boot scenarios, that is, cold boot, warm boot in real mode and warm boot in protect mode. Initially, however, some commentary on INTEL compatibility during system power up is necessary. The INTEL 80386, 80486 and Pentium processors begin execution at physical memory address FFFFFFF0h in ROM, which is 16 bytes beneath the top of memory. This necessitates placement of the BIOS ROM at address range FFFE0000h–FFFFFFFFh. IBM PC architecture, however, requires the BIOS ROM to be placed at location 000E0000h–000FFFFFh. These requirements are met by "dual mapping," that is, memory accesses for both ranges are directed to the same physical ROM part. For performance reasons, memory references to the 000E0000h–000FFFFFh region may be directed to shadow RAM. Normally, all this is nearly transparent to the POST/BIOS code, it being necessary only to copy the contents of the ROM to the shadow memory at the appropriate time during initialization.

Figure 1:
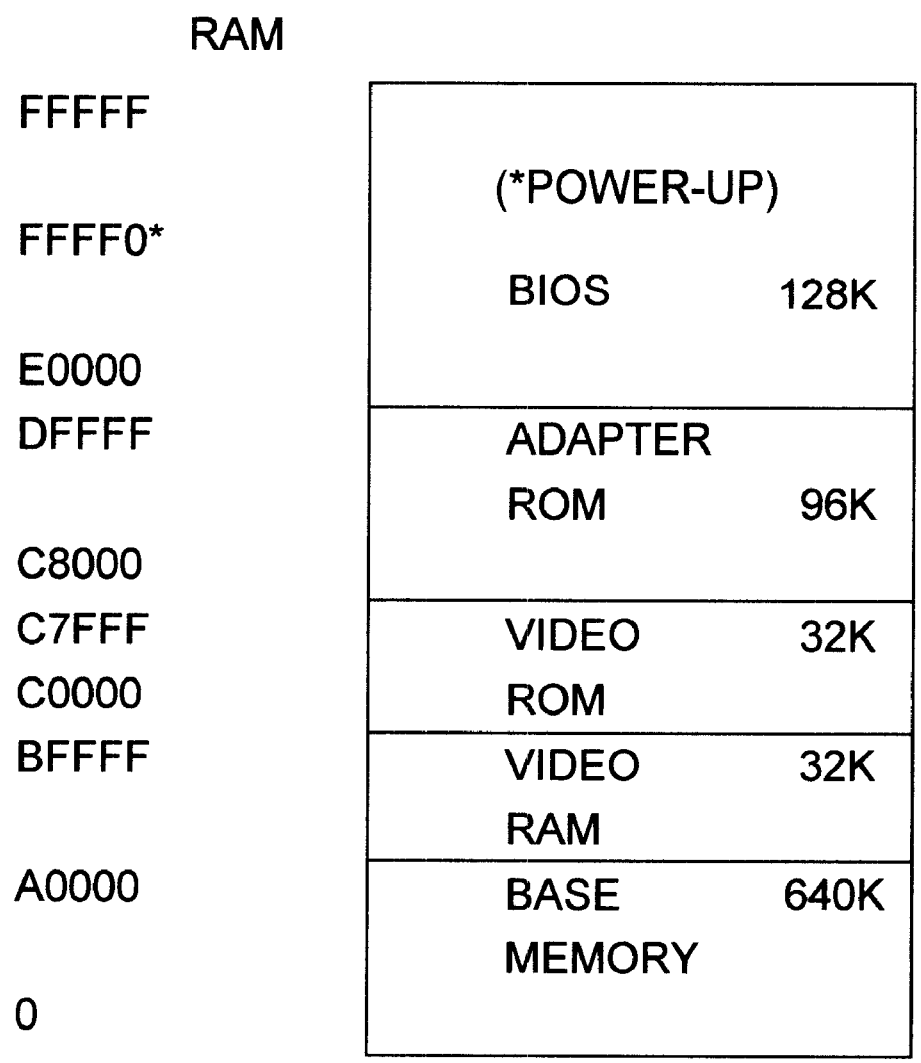
FIG. 1 is a map of the first 1M of random access main memory in the PC operating environment.

The cold boot scenario, in accordance with the invention, is shown in FIGS. 6(a) and 6(b), wherein upon power up (step 40), the system begins execution at location FFFFFFF0h per INTEL convention (step 42), and for IBM compatibility control is transferred (step 44) to memory address in the 000F0000h through 000FFFFFh region, as shown in the IBM PC compatible RAM map of FIG. 1.

Next, the phase 1 portion of POST is executed directly from uncompressed code in the BIOS ROM (step 46). This portion of the POST code is sufficient to enable the system memory (step 48), readying the memory to store any data written to it.

Next, for improved performance the entire ROM image is transferred to the system memory (step 50) and the microprocessor cache is turned on (step 52). Control of the system is now transferred to the RAM image of POST, shown in FIG. 4 (step 54).

As BIOS routines are needed, they are now selectively decompressed from system RAM to system RAM (step 56). The POST may be decompressed into any other region of RAM within or outside the system RAM range of addresses including the region ultimately to be occupied by the operating system.

Next, the uncompressed images are copied from the current region of system RAM back into the shadow RAM (step 58). Decompression occurs selectively in a similar manner for other compressed images of the BIOS code, other than setup which in this example has not yet been called (step 60). Control of the system is transferred to the shadow image of POST (step 62).

Execution of POST continues. If Setup is now to be run because the user has operated a key during initialization, the Setup code is decompressed from system RAM to system RAM at an address range within the system memory shown in FIG. 5, and executed (step 60). When the setup routine has been completed, the system is automatically restarted (step 68) and normal execution of POST and BIOS routines continued (step 70).

Referring next to FIG. 7, the process for a warm boot scenario in real memory mode, that is, when only conventional memory is running (for a system having one megabyte of memory or less) is disclosed. The warm boot is similar to cold boot but encounters a complication. That is, the uncompressed phase one POST code in ROM must be executed, but at this time the decompressed shadow RAM image is currently mapped into the 000F0000h–000FFFFFh address region. Consequently, the BIOS must undergo a memory swapping process to change ROM mapping. Thus, referring to FIG. 7, upon a warm boot call (step 74), BIOS restarts the system by transferring control to address 000FFFF0h in shadow RAM (step 76), the required location under IBM PC compatibility requirements, as shown in FIG. 1. Control of the system is transferred to the shadow RAM BIOS 000E0000h–000EFFFFh region of memory address. The address region 000F0000h–000FFFFFh, which corresponds to the BIOS image in shadow RAM is remapped from the shadow RAM to the ROM (step 80), and system control is transferred to the 000F0000h–000FFFFFh region in ROM (step 82). In system chip sets that do not allow independent 64K segments, the 128K BIOS image is copied to another region in memory. The address region 000F0000h–000FFFFFh then remaps into the ROM as step 80. In this instance the remapping is to complete BIOS image at region 000E00001–000FFFFh. Initialization then continues as in the cold boot scenario.

Considering next the warm boot scenario in protect mode, it is first pointed out that under protect mode an expanded memory device driver, such as EMM.386, or an operating system such as OS/2 or Windows (™), is running the system. EMM.386 drivers or the like intercept any warm boot command issued from the keyboard. Another factor arises when an application issues a BIOS shutdown. In these instances, the first instruction executed by the processor must be identical in both the ROM image and the decompressed BIOS image.

Thus, referring to FIG. 8, if the user calls for a warm boot from the keyboard (step 90), system control is transferred to memory address 000FFFF0h (step 92) as in the previously described warm boot scenario. Alternatively, if there is a program call for a warm boot (step 96), the CMOS shutdown code is set (this occurs using DOS, Windows, OS/2 or AIX operating systems) (step 98). In either the keyboard or program warm boot call case, the CPU is reset (steps 94 and 100), and control as in the cold boot scenario, jumps to address FFFFFFF0h of the ROM (step 102). Unlike the cold boot scenario, however, control is transferred to the 000F0000h–000FFFFFh region of shadow (step 104), and warm boot continues as described for the previous example (step 106).

It is important to note that in the process in accordance with the invention, control proceeds to the same address in ROM (cold boot) and shadow RAM (warm boot). Hence, the instruction at address FFFFFFF0h must be identical to the one at address 000FFFFF0h. This implies that code must exist at the target address in both locations, the BIOS build process must ensure that condition.

As has been described, this invention enables compression of most of the contents of the BIOS ROM and bootstrapping of the system upon BIOS code decompression, by storing only the initial portion of the POST code in BIOS ROM, sufficient to enable the system memory. Upon cold booting, the uncompressed portion of POST is executed to enable the system memory, and then the BIOS is copied to system RAM. As needed, selected portions of the BIOS code, are decompressed to another address region of the system RAM, with all but a portion of POST being copied to shadow RAM. The decompressed portions of BIOS are executed, the system restarted and normal execution of POST and BIOS continued. BIOS mapping and shell processes are performed to suitably carry out warm boot scenarios.

Still other objects and advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

What is claimed is:

1. A method of expediting initialization of a data processing system of a type having a central precessing unit (CPU), a ROM storing permanent BIOS code and a data processing system memory for selectively storing data, including system RAM memory and a ROM containing, in uncompressed form, a first portion of BIOS code for carrying out prescribed functions sufficient to enable the system memory and, in compressed form, another portion of BIOS code for carrying out other prescribed functions, the method comprising, the steps of:

in response to a cold boot call,
(a) executing the uncompressed portion of BIOS for carrying out the prescribed functions from the ROM to enable the system memory;
(b) copying the uncompressed portion for carrying out the prescribed functions and the compressed portion of the BIOS code for carrying out the other prescribed functions from the ROM to the system RAM memory;
(c) expediting the initialization process by decompressing a selected portion of the compressed portion of the BIOS code for carrying out the prescribed functions in the system RAM memory to another prescribed and lower address location region of the system RAM memory; and
(d) executing the decompressed BIOS code for carrying out the prescribed functions from the system RAM memory.

2. In response to a warm boot call following a cold boot call and in conjunction with a real memory mode of operation, a method of expediting the warm boot call a data processing system having a central processing unit (CPU), a ROM storing permanent BIOS code and a system RAM memory, including shadow RAM, for selectively storing data, wherein a first portion of the BIOS code for carrying out prescribed functions, in the ROM is stored in uncompressed form and includes BIOS code sufficient to enable the system memory and to uncompress BIOS code, and another portion of the BIOS code for carrying out other prescribed functions. in the ROM is stored in compressed form, comprising, the steps of:

(a) transferring system control to address 000FFFF0h in the shadow RAM BIOS region of system memory;

(b) remapping the address region 000F0000h–000FFFFFh in ROM corresponding to the BIOS image in shadow RAM;

(c) transferring system control to the remapped memory address region in ROM;

(d) initiating execution at the remapped memory address region in ROM and transferring control to a second memory address in the ROM;

(e) expediting the call by executing the uncompressed portion of BIOS from the second memory address in the ROM to enable the system memory;

(f) copying at least that portion of the entire ROM image of the BIOS not executed in step (e) including the compressed form of the BIOS code from the ROM to a first region of the system RAM memory;

(g) decompressing a selected portion of the compressed portion of the BIOS code from the first region of the system RAM memory to a second region of the system RAM memory outside the first region of the system RAM memory; and (h) expediting the call by executing the BIOS code from the system RAM memory.

3. In response to a warm boot call from a keyboard or a program following a cold boot call and in conjunction with a protect memory mode of operation, a method of expediting the initialization of a data processing system having a central processing unit (CPU), a keyboard, a ROM storing permanent BIOS code and a system RAM memory, including shadow RAM, for selectively storing data and a program, wherein a first portion of the BIOS code in the ROM for carrying out prescribed functions is stored in uncompressed form and includes BIOS code sufficient to enable the system memory and to uncompress BIOS code, and another portion of BIOS code in the ROM for carrying out other prescribed functions is stored in compressed form, comprising, the steps of:

(a) resetting the CPU through a transfer of the system control to address 000FFFF0h in the shadow RAM BIOS region of the system memory providing the warm boot call is from the keyboard, or, alternatively, by setting a shut down code for the CPU providing the warm boot call is from the program;

(b) transferring system control to address FFFFFFF0h in the ROM;

(c) transferring system control to the address region 000F0000h–000FFFFFh of shadow RAM;

(d) remapping the address region 000F0000h–000FFFFFh in ROM corresponding to the BIOS image in shadow RAM;

(e) transferring system control to the remapped memory address region in ROM;

(f) initiating execution at the remapped memory address region in ROM and transferring control to a second memory address in the ROM;

(g) expediting the initialization by executing the uncompressed portion of BIOS from the second memory address in the ROM to enable the system RAM memory;

(h) copying at least that portion of the entire ROM image of the BIOS not executed in step (g) including the compressed form of the BIOS code from the ROM to a first region of the system RAM memory;

(i) decompressing a selected portion of the compressed portion of the BIOS code from the first region of the system RAM memory to a second region of the system RAM memory outside the first region of the system RAM memory; and (j) expediting the initialization by executing the BIOS code from the system RAM memory.

* * * * *